United States Patent [19]
Loveridge

[11] Patent Number: 5,384,865
[45] Date of Patent: Jan. 24, 1995

[54] ADAPTIVE, HYBRID MEDIAN FILTER FOR TEMPORAL NOISE SUPPRESSION

[75] Inventor: Jennifer C. Loveridge, North Harrow, England

[73] Assignee: Eastman Kodak Company, Rochester, N.Y.

[21] Appl. No.: 891,088

[22] Filed: Jun. 1, 1992

[51] Int. Cl.$^6$ .............................................. G06K 9/40
[52] U.S. Cl. ........................................ 382/54; 382/41; 348/620
[58] Field of Search ...................... 382/41, 54; 358/36, 358/105, 167; 364/724.01, 724.17

[56] References Cited

U.S. PATENT DOCUMENTS

| | | | |
|---|---|---|---|
| 4,064,530 | 12/1977 | Kaiser et al. | 358/36 |
| 4,398,210 | 8/1983 | Liu et al. | 358/36 |
| 4,661,853 | 4/1987 | Roeder et al. | 358/105 |
| 4,682,230 | 7/1987 | Perlman et al. | 358/167 |
| 4,737,850 | 4/1988 | Lu et al. | 358/167 |
| 4,809,069 | 2/1989 | Meyer et al. | 358/166 |
| 4,827,342 | 5/1989 | Ohta et al. | 358/167 |
| 4,864,403 | 9/1989 | Chao | 358/167 |
| 4,953,032 | 8/1990 | Suzaki et al. | 358/105 |
| 4,954,894 | 9/1990 | Kitaura | 358/167 |

OTHER PUBLICATIONS

"Recursive 2 Dimensional Median Filtered Signals with Impulsive Noise", R. J. Crinon and G. R. Arce, Proceedings of Seventh Annual Micro-Delcon '84, IEEE, Mar. 6, 1984, pp. 117-123.

"The Use of Median Filters for Edge Detection in Noisy Signals", R. A. Stein and T. J. Fowlow, Proceedings of 1985 International Symposium on Circuits and Systems, vol. 3 of 3, IEEE Cat. No. 85CH2114-7, pp. 1331-1334.

"Median Filtering of Television Images", Terence Doyle and Peter Frencken, 1986 IEEE International Conference on Consumer Electronics, Session XIII-–Digital TV II, pp. 186-187.

"Digital Image Sequence Processing Using the Median Filter," B. Alp et al., Sahko 63 (1990) 6, 7-8, pp. 26-27, 42-48.

Primary Examiner—Leo H. Boudreau
Assistant Examiner—Chris Kelley
Attorney, Agent, or Firm—David M. Woods

[57] ABSTRACT

A median filter is modified for temporal suppression of image grain in a time-varying sequence of images. Successive sets of samples are produced by operation of a sample producer (20), each set including a current sample, a sample delayed by a framestore (50), and a sample derived from a recursive component generator (60). A median selector (80) operates upon each set to select the median sample value. Either the median value or the current sample is selected for the filter output, dependent upon an interframe magnitude generated by an adaptive component generator (30). Evaluation of interframe magnitude minimizes artifacts in the reproduction of picture information that is temporarily impulsive, while including the recursive component in the median sample set increases the level of grain suppression.

4 Claims, 1 Drawing Sheet

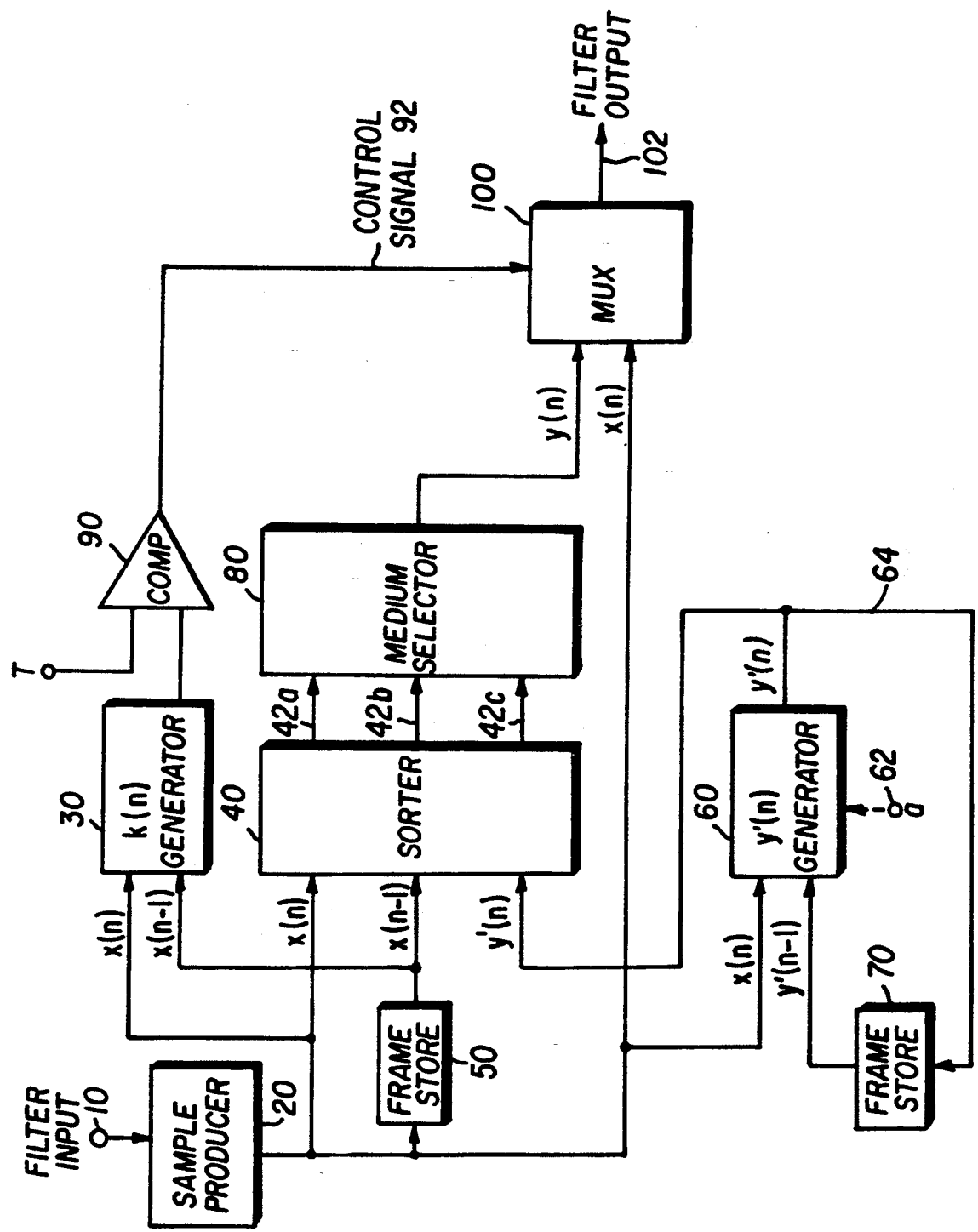

ADAPTIVE, HYBRID MEDIAN FILTER FOR TEMPORAL NOISE SUPPRESSION

FIELD OF INVENTION

This invention pertains to signal processing systems, and in particular to the median filtering of sampled signals.

BACKGROUND OF THE INVENTION

Median filtering is a non-linear filtering technique that is well known for the ability to remove impulsive-type (white) noise, while preserving sharp edges. The standard median filter is described in the literature as follows:

$$y(i) = \text{median}$$

where x(i) and its associated values are the input sample sequence, and y(i) is the output value from the standard median filter applied (spatially) to a window of size 2N+1. The filter is implemented, e.g., with a tapped delay line, by ranking the pixel values (obtained from the taps) that lie within the window in order of magnitude and then selecting the middle (median) value.

The recursive median filter is a modification of the standard median filter that improves the ability of the filter to remove noise while using a much smaller number of taps. In this case, the window centered on position i contains previously calculated (median) values, y(i−N) to y(i−1) in addition to the input values x(i) to x(i+N). For a window width of 2N+1, the recursive form of the filter is $$y(i) = \text{median}$$

Traditionally, median filters have not been used for spatial grain-suppression because of the high spatial correlation of grain (i.e., such grain noise is not impulsive), but have found wide application in the suppression of impulsive electrical noise. Median filtering is also used in television applications, for example in the generation of an image sequence with progressive scanning from an interlaced original.

In an electronic imaging system which is concerned with a time-varying sequence of images, noise suppression can be implemented in the spatial domain, the temporal domain, or in a combination of the two. Any algorithm which operates in the temporal domain must take account of image motion in order to avoid the introduction of unwanted motion-blur. In one well-known method, that result is achieved by the use of finite (FIR) or infinite (IIR) response filters in the time direction which have coefficients or time-constants dependent on the value of the interframe difference at each pixel position. Filtering algorithms in this class are generally referred to as "motion-adaptive".

In the temporal domain, grain-noise is impulsive (i.e., not correlated), and hence the median filter can be used in the time direction to suppress noise while preserving sharp interframe changes (i.e., rapid motion). This is done without the need for explicit motion detection. The use of the standard median filter for this application is described in the literature (see, e.g., "Digital Image Sequence Processing Using the Median Filter," B. Alp et al, Sahko 63 (1990)6, 7–8, pp. 26–27, 42–48).

The operation of a median filter may be made adaptive with respect to, for example, the noise density, as disclosed in the U.S. Pat. No. 4,682,230, which was issued Jul. 21, 1987 in the name of Perlman et al. If the noise density is high, the sample value need deviate only a small distance from the median value for it to be replaced by the median. If the noise density is low, a sample value must deviate by a greater distance for it to be replaced by the median value. Absent such deviation, the sample value is not replaced and is passed through to the output of the filter. In each case, therefore, the largest deviations (impulsive noise) are filtered, and the smallest deviations (presumably, signal) are unchanged.

The standard, recursive, and adaptive median filters, as heretofore described, have two limitations, particularly with regard to temporal image processing. First, each removes impulsive portions of the signal; the standard and recursive median filters do this independently of the magnitude of the impulse, i.e., the middle value is always selected. The adaptive median filter, as in the Perlman et al reference, removes impulsive portions as a function of noise density and the dynamic range of the samples within the filter window. None of the filters, however, can distinguish between white (impulsive) noise and picture signals of small spatial extent that are sufficiently fast-moving to be temporally impulsive. Secondly, the median filter, even in its recursive form, requires significantly more taps to achieve the same level of noise suppression than the IIR filters already discussed. Since the filter is to be applied in the time direction, the hardware implementation requires a frame store for every filter tap, and this has significant cost implications.

SUMMARY OF THE INVENTION

Although grain-noise is spatially correlated, in the temporal direction it is characterized by brief, uncorrelated pulses, that is, it has an impulsive character. Hence, the median filter is especially useful in reducing temporal grain-noise without degradation of slowly-moving edges. However, in the temporal domain fast-moving picture information of small spatial extent may also be represented by a impulsive signal, generally of high amplitude. Use of a conventional median filter tends to remove all impulsive signals, and therefore may remove small, fast-moving objects from the image in addition to the grain-noise. The invention addresses this problem by adaptively selecting the output from the median filter.

Furthermore, in order to achieve an adequate level of grain-suppression, it is generally necessary to use a temporal median filter, or recursive median filter, with a larger number of taps than is practical to implement in hardware. The invention addresses this problem in a novel manner with a hybrid combination of median and recursive (IIR) filtering techniques.

More specifically, the filter includes a recursive (IIR) function as one of the samples in the median filter window, and adapts the output, that is, whether it is to be filtered or not, to the interframe signal difference.

According to one aspect of the present invention, the median filter apparatus comprises: a source of input signal obtained from a time-varying sequence of images; means for recursive-filtering said input signal; means responsive to said input signal for producing successive sets of samples representing said input signal, each set including at least a current image sample, a spatially-corresponding image sample from another image, and a recursive sample derived from said recursive-filtering means; and means for median-filtering said successive sets of samples. In a further aspect of the invention, its adaptive nature is obtained by generating a control signal from a spatially corresponding image difference between the images. The median-filtering of the samples then responds to the control signal.

One advantage of the hybrid median filter is due to its adaptive nature, which allows the filter to perform better than the standard median filter on fast-moving picture information of small spatial extent.

Several other advantages derive from inclusion of an IIR (recursive) term in the window of the median filter:
(a) A high level of grain-suppression is achieved employing a smaller number of filter taps (frame stores), as compared with other median filter configurations. In stationary grain-only areas of the image the output of the median filter will generally be the IIR term, and hence in these circumstances the algorithm produces grain-suppression equivalent to motion-adaptive IIR algorithms;
(b) Improved grain-suppression is achieved around areas of motion, as compared with an adaptive IIR filter; and
(c) Sharp moving-picture information is preserved compared with finite (FIR) and infinite (IIR) response algorithms. The frequency response of the median filter is exact in the presence of a moving edge, since the output value is exactly equal to one of the local input values (although there may be a small phase shift).

BRIEF DESCRIPTION OF THE DRAWINGS

The invention will be described with reference to the Figure, which shows a block diagram of an adaptive, hybrid median filter according to the invention.

DESCRIPTION OF THE PREFERRED EMBODIMENTS

Before proceeding to a hardware implementation of the filter according to the invention, it is helpful to examine the analytical basis of the filter. In particular, the filtered sequence for a median filter, designed according to the invention with a three pixel window, is $$y(n) = \text{median} \qquad (1)$$

where x(n) is the (i,j)th input pixel value of the current frame, x(n−1) is the (i,j)th pixel value of the previous frame, y (n) is the (i,j)th output, filtered pixel value in the current frame, and y'(n) is generated using a recursive filter, in particular $$y'(n) = (1-a)x(n) + ay'(n-1) \qquad (2)$$

In this specific example, the time constant "a" of the recursive filter is fixed and has no dependence on a motion-detection signal. However, in certain circumstances there may be an advantage in making "1" variable, that is, motion-adaptive. A value of "a"=0.75 appears to provide a level of grain-suppression equivalent to the optimum IIR algorithms. In the preferred embodiment, a first-order IIR filter has been chosen, although a higher order filter could be used for higher performance at the cost of extra frame storage.

The algorithm also has an adaptive component, based on an interframe difference signal calculated for each pixel position, $$k(n) = |x(n) - x(n-1)| \qquad (3)$$

with x(n) and x(n−1) defined as before.

If k(n) has a value less than or equal to some predetermined threshold, T, then the algorithm is used in the standard form (1) described above. However, if k(n)>T, then impulsive picture information is assumed and hence:

$$y(n) = x(n) \qquad (4)$$

Two frame stores are required to implement the filter algorithm in this form; the first to store pixel values of the delayed input frame for equations (1) and (3), and the second to implement the temporal recursive filter (2).

In the Figure, the input signal that is being filtered is applied to an input terminal 10, which is connected to a sample producer 20. The sample producer 20 samples the input signal and produces a current sample x(n) for a current frame of image signals. The current sample is coupled to an adaptive component generator 30, a sample sorter 40, a framestore 50, and a recursive component generator 60. The framestore 50 delays its input signal by a full image frame, thereby producing at its output a delayed sample x(n−1) for a preceding frame; sample x(n−1) thus spatially corresponds to the current sample x(n) in the current frame. The delayed sample x(n−1) is coupled to other inputs of the sample sorter 40 and the adaptive component generator 30. Equation (3) is implemented by the adaptive component generator 30, that is, an interframe difference between the current sample x(n) and the previous frame sample x(n−1) is obtained. Equation (2) is implemented by the recursive component generator 60 in combination with a further framestore 70, that is, a temporal smoothed value, proportioned by the value "a", is obtained for the input signal x(n). While the value "a" that is input on a terminal 62 to the generator 60 is heretofore described as a constant (e.g., "a"=0.25), it may be made adjustable for further motion-adaptive results. A feedback loop 64 through the framestore 70, which delays the output signal y'(n) by a full frame, and the current sample value x(n), provide the necessary inputs for the recursive function.

The three values within the window of the median function—x(n), x(n−1), and y'(n)—are applied to inputs of the sample sorter 40. A typical sorter would include an array of comparators (not shown) which sort the input samples by magnitude. The sample sorter produces at respective output terminals 42a, 42b, 42c an ordered list of values of the input samples. For example, a sample having the greatest magnitude value is produced at topmost terminal 42a, a sample having the least magnitude value is produced at bottom-most terminal 42c, and the middle value is produced on the middle terminal 42b. A median selector 80 selects the middle sample value as the output y(n) of the median filter. The median selector 80 may be a multiplexing circuit having the middle sample output from the sorter 40 coupled to the output terminal of the multiplexing circuit. Thus, it can be seen that equation (1) is implemented by the combined operation of the sample sorter 40 and the median selector 80.

The filter is said to be hybrid because it uses the recursive output y'(n) in its input sample sequence. While described as a "sample value", this value y'(n) is not so much a distinct sample in the input sequence as a reevaluated, and smoothed, estimate of the current sample. As such and as heretofore explained, it is the most likely median value in slow moving, or stationary, areas of the frame sequence. Consequently, grain-noise suppression is obtained in such areas.

The adaptive component generator 30 generates an interframe difference signal defined by equation (3), and a comparator 90 compares the difference signal output by the generator 30 to a threshold T that is separately input to the comparator 90. The output of the comparator 90 is a control signal 92 for controlling the operation of an output multiplexer 100. The current sample value x(n) and the median value y(n) are input to the multiplexer 100, and the output 102 of the adaptive hybrid filter is taken from the output of the multiplexer 100.

In operation, when the interframe difference signal (absolute value) output by the generator 30 is less than or equal to the predetermined threshold T, then the control signal 92 sets the multiplexer 100 to pass the median value y(n) through to the filter output 102. This condition is obtained when the current frame, compared to the preceding frame, does not show evidence of fast-moving image. Consequently, the grain suppression benefit of the recursive component 60 is allowed to influence the output signal 102, and the median of the current value x(n), the preceding value x(n−1), and the recursive component y'(n) is chosen. When the interframe difference signal is greater than the threshold T, the control signal 92 is inactive, and the current value x(n) passes through the multiplexer 100 without change to become the filter output 102. This condition is obtained when a fast moving image generates a brief (impulsive) interframe difference signal characteristic of a rapidly changing signal level, particularly when a pixel registers a sudden signal excursion due to movement that is unseen in the temporally-preceding pixel, i.e., the image is moving faster than the frame rate of the system.

The invention has been described in detail with particular reference to a presently preferred embodiment, but it will be understood that variations can be affected within the spirit and scope of the invention. For instance, the window of the median filter may include more than the current and preceding frames; likewise, the output of the filter could be a function of a group, block, or area of pixels in each frame, rather than a single pixel for each frame. Of course, such modifications increase complexity. The invention was also described in connection with a sample data system. In a typical sampled system, the data would also be digitized. The sample producer 20, for example, could be part of analog-to-digital conversion. In a digital system, each of the component blocks in the Figure would be clocked to reset and control timing throughout the overall circuit.

What is claimed is:

1. Median filter apparatus, comprising:
   a source of input signals obtained from successive frames of a motion image;
   means for recursive-filtering said input signals;
   means for generating a control signal from an interframe difference between input signals from successive frames;
   means responsive to said input signals for producing successive sets of samples representing said input signals, each set including at least a current sample from a current frame, a spatially-corresponding sample from a preceding frame, and a recursive sample derived from said recursive-filtering means;
   means for median-filtering said successive sets of samples to produce a median sample; and means responsive to said control signal for selecting either said median sample or said current sample as the output of the median filter.

2. Median filter apparatus as claimed in claim 1 wherein the control signal generating means compares the interframe difference to a threshold and produces a predetermined control signal if the difference is less than the threshold.

3. Median filter apparatus as claimed in claim 2 wherein said selecting means responds to said predetermined control signal by outputting the median sample.

4. Median filter apparatus as claimed in claim 2 wherein said selecting means outputs the current sample if the interframe difference is greater than the threshold.

* * * * *